United States Patent [19]
Winslow

[11] 3,806,190
[45] Apr. 23, 1974

[54] ENERGY ABSORBING SEAT SUPPORT ASSEMBLY

[75] Inventor: Gerald R. Winslow, Royal Oak, Mich.

[73] Assignee: General Motors Corporation, Detroit, Mich.

[22] Filed: July 20, 1972

[21] Appl. No.: 273,437

[52] U.S. Cl. .............................................. 297/216
[51] Int. Cl. .............................................. B60n 1/08
[58] Field of Search ...................... 297/216; 188/1 C

[56] References Cited
UNITED STATES PATENTS

| | | | |
|---|---|---|---|
| 2,953,189 | 9/1960 | Barash | 297/216 |
| 2,998,281 | 8/1961 | Stower et al. | 297/216 X |
| 3,730,586 | 5/1973 | Eggert | 297/216 |
| 3,022,976 | 2/1962 | Zia | 297/216 |
| 3,552,795 | 1/1971 | Perkins et al. | 297/216 |
| 2,346,895 | 4/1944 | Bergmann | 297/216 |
| 3,473,775 | 10/1969 | Rice | 297/216 |
| 3,524,677 | 8/1970 | Louton | 297/216 |
| 3,059,966 | 10/1962 | Spielman | 297/216 |
| 3,604,285 | 9/1971 | Olsson | 188/1 C |
| 3,696,891 | 10/1972 | Poe | 188/1 C |
| 3,507,472 | 4/1970 | Agee et al. | 297/216 |
| 2,818,909 | 1/1958 | Burnett | 297/216 |
| 2,682,931 | 7/1954 | Young | 297/216 |

*Primary Examiner*—Paul R. Gilliam
*Attorney, Agent, or Firm*—Herbert Furman

[57] ABSTRACT

An assembly for supporting a vehicle seat for energy absorbing movement within a vehicle in response to abrupt vehicle acceleration or deceleration. The assembly includes a first track member mounted on the vehicle body floor extending longitudinally of the vehicle and having a pair of plastically deformable flange portions spaced laterally relative to each other and extending along the length of this track member with generally continuous contours interrupted by arcuate depressions. A second track member of the assembly supports the seat and has laterally spaced flange portions which mount plastic guide members that slidably receive the flange portions of the first track member to support the seat for movement longitudinally of the vehicle. A pair of bolts mount the base portion of a die member on the second track member with arcuate deforming portions of the die member respectively received within the arcuate depressions in the flange portions of the first track member so as to plastically deform these flange portions as the seat moves longitudinally of the vehicle in response to abrupt changes in the rate of vehicle movement. Spacers of varying thicknesses are readily interposed between the second track member and the base portion of the die member to allow control of the degree to which the deforming portions are received within the depressions and the consequent degree of plastic deformation and quantity of energy absorbed during a given unit length of seat movement.

4 Claims, 5 Drawing Figures

ENERGY ABSORBING SEAT SUPPORT ASSEMBLY

BACKGROUND OF THE INVENTION

The U.S. Pat. of Perkins et al No. 3,552,795, which is assigned to the assignee of the present invention, discloses a seat mounted on a vehicle body floor by an energy absorbing support assembly. This assembly allows the seat to move longitudinally of the vehicle under the impetus of large acceleration or deceleration forces and to plastically deform portions of the assembly such that energy is absorbed during this movement. A restraint belt attached to the seat and operable to secure a seated occupant thus allows the occupant's acceleration or deceleration to be somewhat gradual when the vehicle is subjected to these conditions. For a given unit length of seat movement with this assembly, the amount of plastic deformation and the resultant quantity of energy absorbed is fixed and cannot be readily varied.

SUMMARY OF THE INVENTION

One feature of this invention is that it provides an improved energy absorbing support assembly for a vehicle body seat in which movement of the seat longitudinally of the vehicle plastically deforms a portion of the assembly to absorb energy and the amount of plastic deformation is readily varied to control the quantity of energy absorbed during a given unit length of seat movement. Another feature of the invention is that the assembly includes an elongated first track member mounted on the vehicle body floor extending longitudinally of the vehicle and an elongated second track member supporting the seat and slidable on the first track member to support the seat for movement longitudinally of the vehicle, with one of the track members including an elongated deformable portion having a generally continuous contour along the longitudinal length of this track member, and with a die member including a deforming portion mounted on the other track member such that the deforming portion plastically deforms the deformable portion of the one track member during the seat movement and is readily adjustable to vary the degree of this plastic deformation and thus control the quantity of energy absorbed during a given unit length of seat movement. Another feature of the invention is that the deformable portion of the one track member takes the form of laterally spaced flange portions extending along the length of this track member with generally continuous contours interrupted by abrupt arcuate depressions, and the die member includes a base portion with laterally spaced deforming portions of arcuate configurations normally received within the depressions to a degree that is readily adjustable in order to control the degree to which these deforming portions plastically deform the flange portions during the seat movement and the resultant quantity of absorbed energy. Another feature of the invention is that spacers of varying thicknesses may be readily interposed between the other track member and the base portion of the die member to provide this control of the quantity of absorbed energy. Another feature of the invention is that the other track member includes laterally spaced flange portions which mount plastic guide members that slidably receive the flange portions of the one track member to provide the sliding interconnection of these track members.

BRIEF DESCRIPTION OF THE DRAWINGS

The above-described features and other features of this invention are readily apparent from the following description of the preferred embodiment and the drawings in which.

DESCRIPTION OF THE PREFERRED EMBODIMENT

Figure 1:
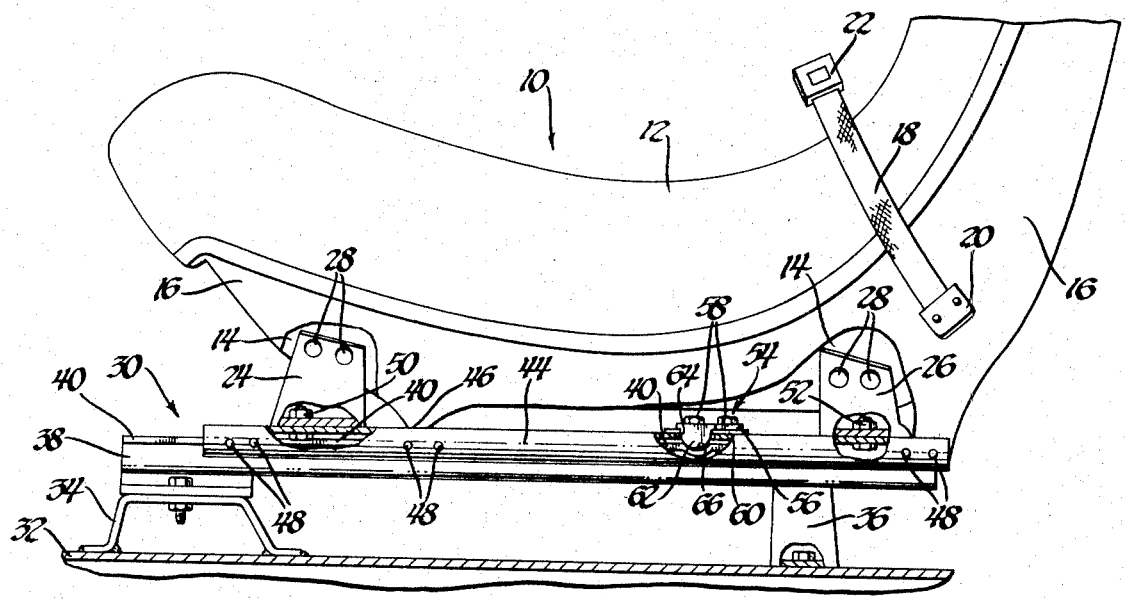
FIG. 1 is a sectional view through a vehicle body floor showing the side of a vehicle seat which is mounted on the floor by an energy absorbing support assembly constructed in a manner according to this invention and shown partially broken away.
Figure 2:
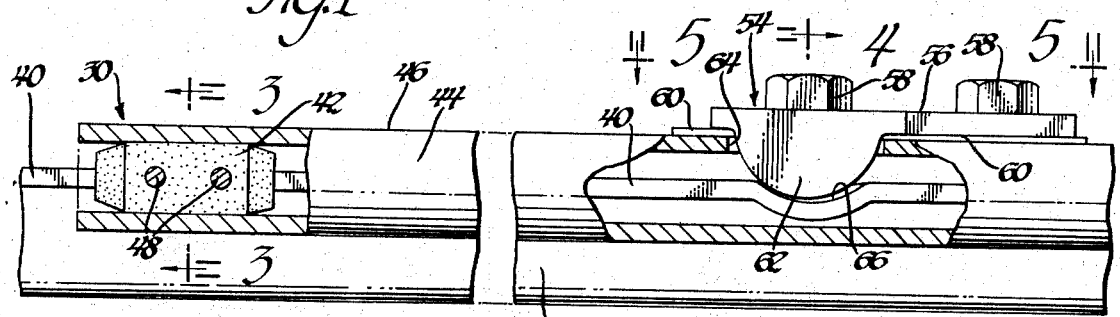
FIG. 2 is an enlarged partially broken away view of certain portions of the support assembly shown in FIG. 1.

Referring to FIG. 1 of the drawings, a vehicle body seat generally indicated by 10 includes an integral foam member 12 providing seat cushion and seat back portions in a conventional manner. Foam member 12 is supported by inner and outer seat pan members 14 and 16 whose edge portions are joined in a suitable manner. A seat belt 18 includes a lower end secured to the pan members of the seat by an attachment 20. The other end of belt 18 includes a suitable attachment device 22 for selectively securing this belt to another belt such that these belts cooperate to restrain an occupant in seated position on seat 10. At each side of the seat, a pair of front and rear seat mounting brackets 24 and 26 are secured to the inner seat pan member 14 by rivets 28. These mounting brackets cooperate with energy absorbing support assemblies 30, only one of which is shown and described, at the respective opposite sides of the seat in order to support the seat on a vehicle body floor 32.

Figure 3:
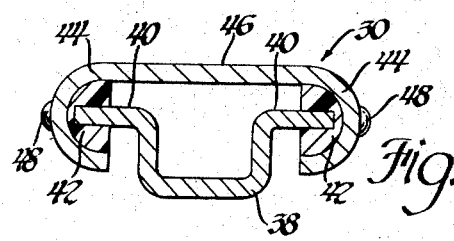
FIG. 3 is a sectional view of the support assembly taken generally along line 3—3 of FIG. 2 and showing the manner in which upper and lower track members of the support assembly are slidably mounted relative to each other.
Figure 4:
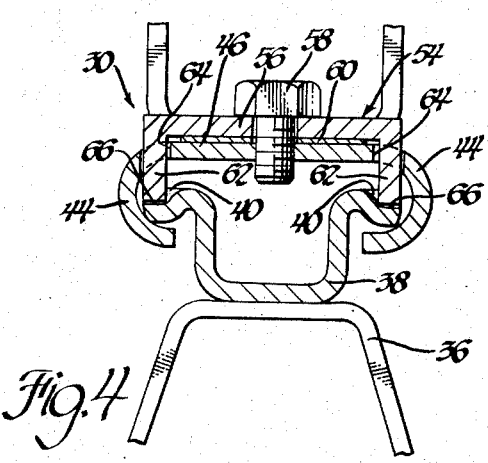
FIG. 4 is a sectional view of the support assembly taken generally along line 4—4 of FIG. 2 and showing a die member mounted on the upper track member and including deforming portions for deforming flange portions of the lower track member such that energy is absorbed during movement of the seat longitudinally of the vehicle.

Support assembly 30 includes front and rear floor mounting bracket arrangements 34 and 36 which are respectively welded and bolted to the floor 32 so as to support the forward and rearward ends of an elongated lower track member 38 fabricated from a suitable plastically deformable material. As can be seen by additionally referring to FIGS. 3 and 4, track member 38 has a generally channel-shaped cross section with a pair of laterally spaced upper flange portions 40 extending from the upper side walls of the channel portion. Guide members 42 of a suitable plastic such as nylon are received within opposed flange portions 44 of an elongated upper track member 46 and include suitable slots for receiving the flange portions 40 to slidably support the upper track member for movement longitudinally of the vehicle body. Respective pairs of rivets 48 secure each of the guide members 42 to the flange portions 44 of the upper track member. Nut and bolt arrangements 50 and 52 respectively secure the front and rear seat mounting brackets 24 and 26 to the front and rear ends of the upper track member 46 such that seat 10 is thus slidably supported with this track member for movement longitudinally of the vehicle body.

Figure 5:
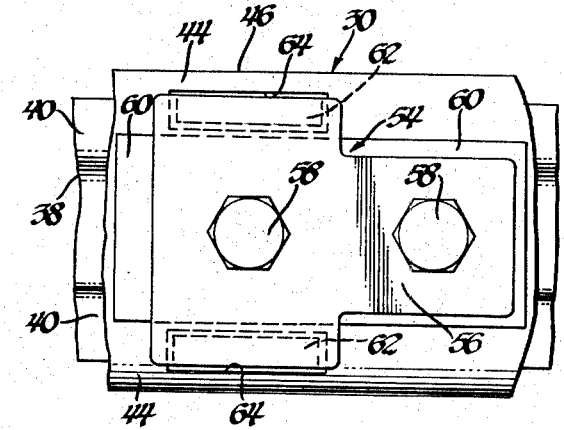
FIG. 5 is a top plan view of the support assembly taken generally along line 5—5 of FIG. 2 and showing the configuration of this die member in a horizontal plane.

A die member generally indicated by 54 is mounted on the upper track member 46 just slightly forward of the rear floor mounting bracket arrangement 36. The die member includes a base portion 56 with a generally T-shaped configuration, see FIG. 5. A pair of bolts 58 are freely received within apertures of the base portion of the die member and within apertures in a spacer 60 interposed between these members and thus controlling the vertical position of the die member relative to this track member. The bolts thread into apertures in upper track member 46 and thus securely position the die member on this track member. Arcuate deforming portions 62 of the die member are integral with the base portion 56 and extend downwardly at each of its sides through respective rectangular apertures 64 in the upper track member 46. The lower ends of deforming portions 62 are respectively received by arcuate depressions 66 in the flange portions 40 of lower track member 38. These depressions interrupt the generally continuous contours of flange portions 40 along the length of this track member. The degree to which these deforming portions are received within the depressions is, of course, dependent upon the thickness of the spacer 60 and may be readily changed by merely loosening bolts 58 and replacing this spacer with a spacer of a different thickness. It is also possible for the deforming portions 62 to be received within the depressions 66 to the maximum degree possible when there is no spacer at all between the upper track member and the base portion of the die member.

Longitudinal movement of upper track member 46 along lower track member 38 and consequent movement of the seat 10 longitudinally of the vehicle is normally prevented by the receipt of the deforming portions 62 within the depressions 66 in the flange portions of the lower track member. When the vehicle body is subjected to abrupt acceleration or deceleration conditions, the inertial forces on the seat 10 will cause it to move longitudinally of the vehicle body such that the deforming portions 62 plastically deform the flange portions 40 of the lower track member. This plastic deformation will occur for both forward and rearward seat movement in this manner. The degree of the plastic deformation and the consequent energy absorbed by a given unit length of seat movement is dependent upon the degree to which the deforming portions 62 are received within the depressions 66. By varying the degree of this receipt, as previously described, it is thus possible to readily control the energy absorbing characteristics of the mounting of the seat.

The energy absorbing support assembly may be modified to have the die member with its deforming portions mounted on the lower track member so as to engage a deformable portion on the upper track member. Also, a seat adjuster mechanism may be interposed between the seat and the support assembly or between the floor and the support assembly to allow longitudinal adjusting movement of the seat.

The invention thus provides an improved energy absorbing support assembly for a vehicle seat which allows the energy absorbing characteristics of the seat to be readily controlled.

What is claimed is:

1. In combination with a vehicle including a floor and a seat, an energy absorbing seat support assembly comprising, an elongated first track member mounted on the floor extending longitudinally of the vehicle, an elongated second track member slidable on the first track member and supporting the seat for movement longitudinally of the vehicle, one of the track members including a pair of plastically deformable flange portions spaced laterally relative to each other and having generally continuous contours along the longitudinal length of this track member, these flange portions defining abrupt laterally spaced preformed depressions at a predetermined position along the length of the one track member, a die member with a pair of laterally spaced deforming portions, and means for mounting the die member on the other track member with the deforming portions received within the depressions defined by the flange portions of the one track member to plastically deform these flange portions when the seat moves longitudinally of the vehicle in response to abrupt vehicle acceleration or deceleration, the mounting means being readily adaptable to receive spacing members of various thickness between the die member and the other track member to control the degree the deforming portions are received within the depressions defined by the flange portions of the one track member and to thereby control the degree of plastic deformation and quantity of energy absorbed during a given unit length of seat movement.

2. In combination with a vehicle including a floor and a seat, an energy absorbing seat support assembly comprising, an elongated first track member mounted on the floor extending longitudinally of the vehicle and including a pair of plastically deformable flange portions spaced laterally relative to each other and having generally continuous contours along the length of this track member, the flange portions defining preformed abrupt arcuate depressions spaced laterally relative to each other at a predetermined position along the continuous contours of these flange portions, an elongated second track member supporting the seat and including laterally spaced flange portions slidably receiving the flange portions of the first track member to support the seat for movement longitudinally of the vehicle, a die member including a base portion with a pair of integral deforming portions spaced laterally relative to each other and having arcuate configurations, and means for mounting the die member on the second track member with the deforming portions received within the depressions in the flange portions of the first track member to plastically deform these flange portions when the seat moves longitudinally of the vehicle in response to abrupt vehicle acceleration or deceleration, the mounting means being readily adaptable to receive spacing members of various thickness between the second track member and the base portion of the die member to allow control of the degree to which the deforming portions are received within the depressions and the consequent degree of plastic deformation of the flange portions and quantity of energy absorbed during a unit length of seat movement.

3. The combination of claim 2 wherein the longitudinal energy absorbing movement of the seat may be in either a forward or rearward direction.

4. The combination of claim 2 wherein the flange portions of the second track member slidably receive the flange portions of the first track member by way of plastic guide members.

* * * * *